US007921782B2

(12) United States Patent
Keller et al.

(10) Patent No.: US 7,921,782 B2
(45) Date of Patent: Apr. 12, 2011

(54) INDIVIDUAL TRANSPORTATION SYSTEM (75) Inventors: Frederick P. Keller, Alto, MI (US);
Benedikt J. Gaegauf, Grand Rapids, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 979 days.

(21) Appl. No.: 10/469,711

(22) PCT Filed: Feb. 6, 2002

(86) PCT No.: PCT/US02/03300
§ 371 (c)(1),
(2), (4) Date: Mar. 5, 2004

(87) PCT Pub. No.: WO02/070317
PCT Pub. Date: Sep. 12, 2002

(65) Prior Publication Data
US 2004/0149158 A1 Aug. 5, 2004

(51) Int. Cl.
*B61B 3/00* (2006.01)
(52) U.S. Cl. .......................................... 104/89; 104/124
(58) Field of Classification Search .................. 104/89, 104/96, 118, 119, 102, 106, 124, 130.1
See application file for complete search history.

(56) References Cited

U.S. PATENT DOCUMENTS

| 180,660 | A | * | 8/1876 | Shreve | 104/124 |
| 2,705,570 | A | * | 4/1955 | Maissian | 414/256 |
| 3,118,392 | A |  | 1/1964 | Zimmerman |  |
| 3,252,208 | A | * | 5/1966 | Reuter et. al. | 29/894.011 |
| 3,254,608 | A |  | 6/1966 | Alden |  |
| 3,590,743 | A | * | 7/1971 | Larson | 104/80 |
| 3,688,921 | A | * | 9/1972 | Zaha | 414/233 |
| 3,744,432 | A |  | 7/1973 | Price et al. |  |
| 3,777,668 | A |  | 12/1973 | Corey |  |
| 3,800,963 | A |  | 4/1974 | Holland |  |
| 3,830,163 | A |  | 8/1974 | Wright et al. |  |
| 3,847,085 | A |  | 11/1974 | Rypinski |  |
| 3,896,955 | A | * | 7/1975 | Collins et al. | 414/254 |
| 3,910,196 | A |  | 10/1975 | Denenburg |  |
| 3,939,775 | A |  | 2/1976 | Barry |  |
| 3,987,734 | A |  | 10/1976 | Horn |  |
| 4,030,422 | A | * | 6/1977 | Pasquan | 104/130.04 |
| 4,109,343 | A |  | 8/1978 | Weis et al. |  |

(Continued)

FOREIGN PATENT DOCUMENTS

DE 3247960 A1 * 8/1984

*Primary Examiner* — Mark T Le
(74) *Attorney, Agent, or Firm* — Price, Heneveld, Cooper, DeWitt & Litton, LLP (57) ABSTRACT

An individual transportation system (10) includes a track system (12), including a primary track section (14), a switching track section (16) and loading/unloading section (18). The transportation system (10) additionally includes a plurality of carriages (20) supported by the track system (12), and a plurality of underslung passenger vehicles (22) each matably engageable with one of the carriages, and adapted to hold at least one passenger therein. The transportation system (10) further includes a storage facility (24) for storing the vehicles (22) when they are disengaged from the carriage, whereby a carriage and vehicle combination traveling on the primary track can be switched between primary track section (14) via an associated switching track section (16), and can be switched to the loading/unloading track (18), wherein the vehicle may be disengaged from carriage (20) and stored in the storage facility (24).

30 Claims, 9 Drawing Sheets

U.S. PATENT DOCUMENTS

| | | | |
|---|---|---|---|
| 4,223,638 A * | 9/1980 | Sappington et al. | 119/57.6 |
| 4,267,778 A * | 5/1981 | Wilkie | 104/94 |
| 4,542,689 A | 9/1985 | Trolle | |
| 4,542,698 A | 9/1985 | Wakabayashi | |
| 4,773,807 A * | 9/1988 | Kroll et al. | 414/282 |
| 4,781,119 A | 11/1988 | Davis | |
| 4,791,871 A | 12/1988 | Mowll | |
| 4,841,871 A | 6/1989 | Leibowitz | |
| 5,069,140 A | 12/1991 | Glassey | |
| 5,691,584 A * | 11/1997 | Toida et al. | 310/67 R |
| 5,881,559 A * | 3/1999 | Kawamura | 60/597 |
| 6,394,537 B1 * | 5/2002 | DeRees | 296/191 |

* cited by examiner

INDIVIDUAL TRANSPORTATION SYSTEM

BACKGROUND OF THE INVENTION

The present invention relates to a transportation system, and particularly to an individual transportation system that includes a plurality of individual vehicles operating on a common track.

Ever increasing demands on conventional individual transportation modes has lead to unacceptable congestion. Expanding populations, most noticeably in urban areas, have begun to overtax our city streets and highway systems designed to support a fraction of the vehicular traffic currently using them. Such congestions have led to unacceptable delays resulting both in wasted time and excessive fuel consumption. In addition, individual traffic as currently organized, depends on each individual to drive his or her vehicle safely and responsibly. Unfortunately, differences in driving skills and levels of responsibility can cause serious injuries or even fatalities.

Another drawback of the current road system includes the extreme costs of the initial road construction, associated safety provisions, and the never-ending maintenance requirements. In addition, because our roads are shared between automobiles and heavy-duty trucks, all of the roads have to be designed for the heaviest loads permitted on each segment. These inefficiencies drive the costs up significantly. In addition of the required acreages of land, the construction of massive highway systems is extremely detrimental to the environmental ecosystems through which the highways extend.

Another drawback associated with most modern vehicles are the complexity and expense thereof. As a result of this complexity and other factors, private vehicles can cost the owners significant amounts of capital to upkeep.

An alternative to highway based transportation systems has been mass transit systems, including trains and subway systems. The most significant drawback with respect to these mass transit systems is the inconveniences associated with their set schedules to pre-determined destinations. Profitable mass transit systems require a significant number of people in need of transportation at a particular location, at a given time, traveling to the same destination. Other destinations can be reached, but only with one or more transfers by the passenger from one route onto another. With heavy usage and the commonly applied principal of first-come-first-serve, people might not have an available seat, or personal space to work in or relax. Mass transit systems are also required to operate at off-peak hours with minimal usage making them expensive to operate.

A individual transportation system is required that relieves traffic congestions, decreases pollution and excessive fuel consumption, and is much safer to operate, while providing the users with the conveniences typically associated with private vehicle ownership and operation.

SUMMARY OF THE INVENTION

The many features and aspects of the present invention make it possible for a person or family to have an individual transportation vehicle which can be called out of a storage system on demand, integrated into a track system, programmed to deliver the user to a desired destination, disengaged from the track system and placed in storage.

One aspect of the present invention is to provide a transportation system that includes a passive track system having at least one main track member, a vehicle defining a carrying space therein, and a carriage system detachably supporting the vehicle from the main track member. The carriage system includes at least one self-contained propulsion unit for generating the power to propel the carriage and support a vehicle along the main track member, and a primary drive for transferring the power generated by the propulsion unit to the main track member and propelling the vehicle along the main track member.

Another aspect of the present invention is to provide a transportation system that includes a static overhead track system including at least one main track member, an underslung vehicle defining a carrying space therein, and a carriage system detachably supporting the underslung vehicle from the main track member. The carriage system includes at least one self-contained propulsion unit for generating the power to propel the carriage and supported vehicle along the main track member, and a primary drive for transferring the power generated by the propulsion unit to the main track member and propelling the vehicle along the main track member.

Yet another aspect of the present invention is to provide a transportation vehicle system that includes a vehicle adapted to define a carrying space therein and adapted to travel in a longitudinal direction, wherein the vehicle includes a first portion of a coupling system, and a carriage system for detachably supporting the vehicle, wherein the carriage system includes a second portion of the coupling system which is mateable with the first portion of the coupling system. The vehicle is coupled and uncoupled with the carriage unit by moving the vehicle in a substantially lateral direction relative to the longitudinal direction of travel of the vehicle.

Yet another aspect of the present invention is to provide a transportation system that includes an overhead track system having a main track member and a switching track member, wherein at least a portion of the main track member and the switching track member are vertically aligned. The transportation system also includes an underslung vehicle defining a carrying space therein and a carriage system supporting the vehicle beneath the overhead track system. The carriage system includes a primary drive for propelling a vehicle along the main track member, and a switching system adapted to switch the carriage system from being supported by the main track member to being supported by the switching track member. The switching system includes a secondary drive for propelling the vehicle along the switching track member. The secondary drive of the switching system swings inline with the main track member, thereby insuring that the secondary drive is aligned with the main track member at all times.

Still yet another aspect of the present invention is to provide a transportation system that includes a track system including a primary track section and a loading/unloading section, wherein at least a portion of the loading/unloading section is offset from the primary track section. The transportation system also includes a plurality of carriages supported by the track system, and a plurality of passenger vehicles each matably engageable with one of the carriages, and wherein each of the vehicles is adapted to hold at least one passenger therein. The transportation system further includes a storage facility for storing the vehicles when they are disengaged from the carriage. A carriage and vehicle combination traveling on the primary track can be switched to the loading/unloading track, wherein the vehicle may be disengaged from the carriage and stored in the storage facility.

The present invention provides an individual transportation system that decreases traffic congestion, fuel consumption and accidents typically associated with a highway based transportation systems. The individual transportation system disclosed herein further provides many of the conveniences associated with mass transit systems such as ease of use and operation, while eliminating inconveniences also associated therewith such as scheduled departures, potential of one or more transfers by the passenger in order to reach a final destination, potential lack of available seating, and no personal space within which to work or relax. Further, the personal individual transportation system is more economical to construct than conventional highway systems and railway systems, is more ecologically sensitive, is capable of a long operating life and is particularly well adapted for the proposed use.

These and other advantages of the invention will be further understood and appreciated by those skilled in the art by reference to the following written specification, claims and appended drawings.

DETAILED DESCRIPTION OF PREFERRED EMBODIMENTS

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
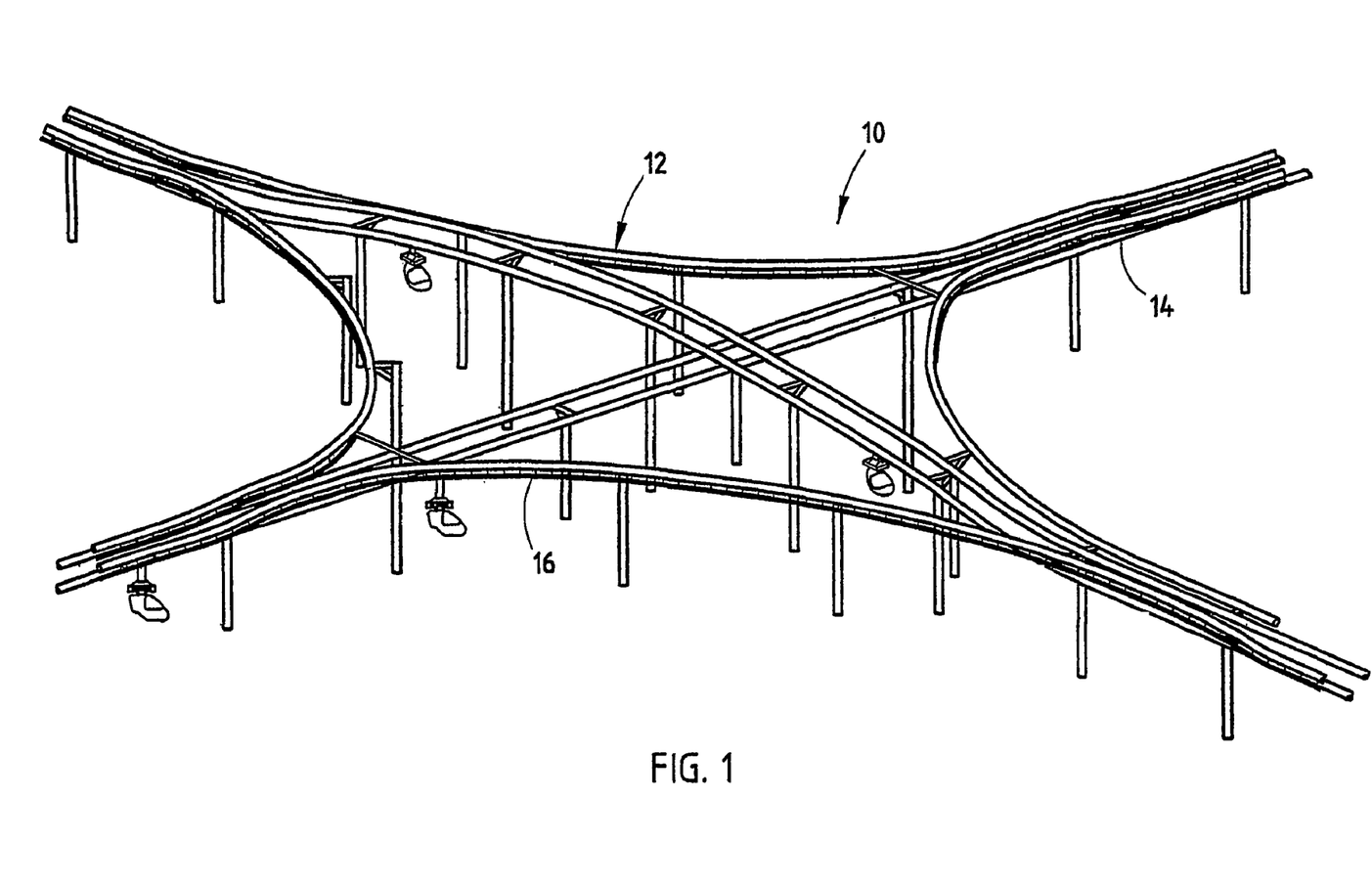
FIG. 1 is a perspective view of the personal rapid transportation system, or transit system, of the present invention.
Figure 2:
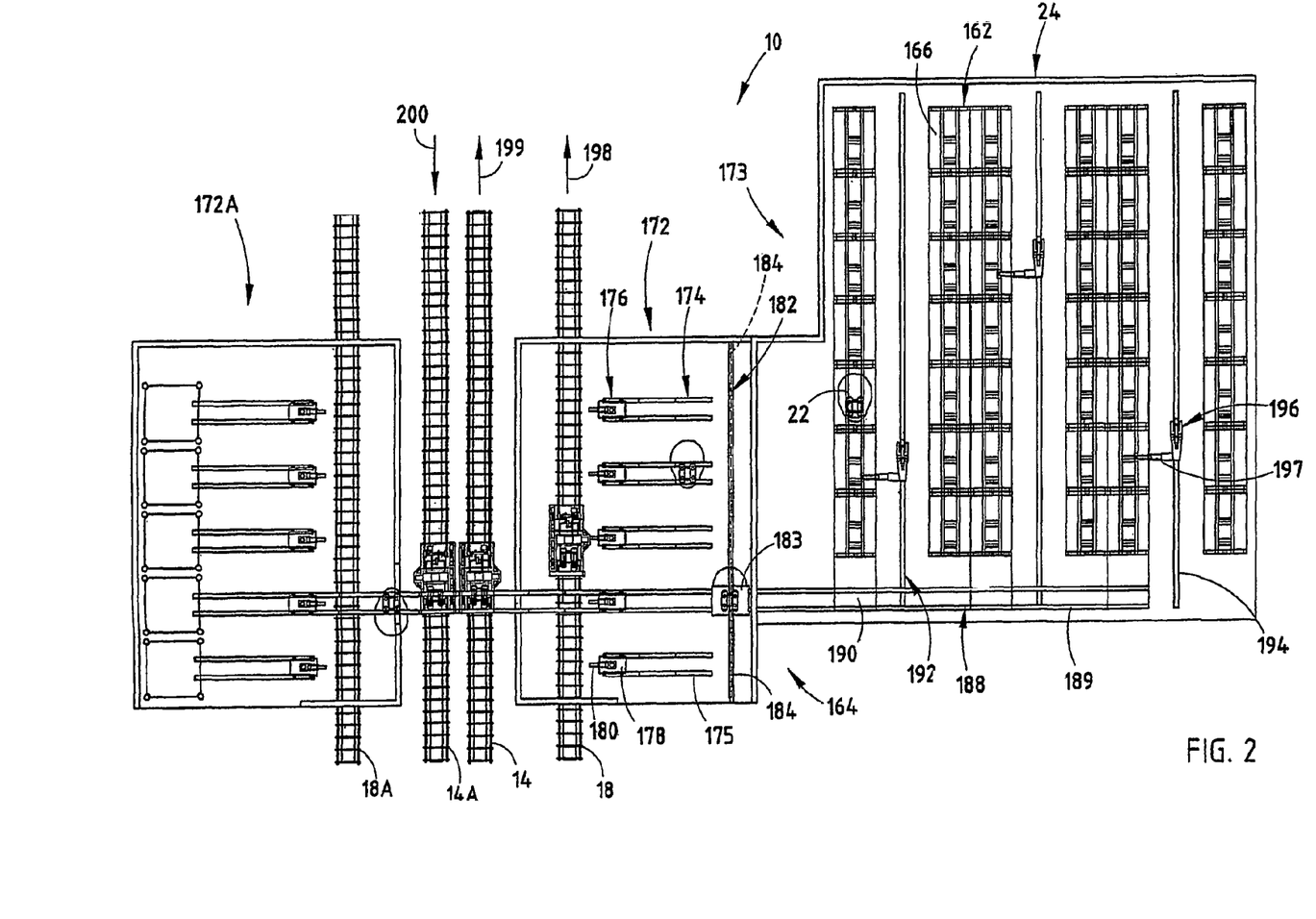
FIG. 2 is a top plan view of the transit system including a loading/unloading track section and a vehicle storage facility including an automatic storage and retrieval system.

The reference numeral 10 (FIG. 1) generally designates the individual transportation system or transportation system embodying the present invention. In the illustrated example, transportation system 10 includes a track system 12 having a primary track section 14, a switching track section 16 and a loading/unloading track section 18 (FIG. 2). The transportation system 10 also includes a plurality of carriages 20 (FIG. 3A) supported by track system 12, and a plurality of passenger vehicles each matably engageable with one of the carriages 20 and adapted to hold at least one passenger therein. Transportation system 10 further includes a storage facility 24 (FIG. 2) for storing passenger vehicles 22 when passenger vehicles 22 are disengaged from their perspective carriage 20 and are not in use.

The track system 12 includes primary track section 14 that extends between points of interest such as urban areas, cities, plants and/or facilities on a business campus, and the like. Switching track section 16 of track system 12 allows switching of the carriage 20 and passenger vehicle 22 combination to be redirected and transferred between different primary track sections 14. Loading/unloading track sections 18 of track system 12 provide for easy loading and unloading of the passenger vehicles 22 onto track system 12.

Track system 12 is a passive track in that no power is supplied to the carriage 20 and passenger vehicle 22 combination while the carriage 20 moves along track system 12, thereby eliminating the possibility of a power supply interruption to the carriage 20 and passenger vehicle 22 combination operating thereon and the possible halting of the numerous carriage 20 and passenger vehicle 22 combinations traveling along track system 12. In addition, track system 12 is a static track in that the track itself is stationary and all switching operations are accomplished via manipulation of the carriage system 20.

Primary track section 14 (FIG. 4A) includes a longitudinally extending main support structure 26. As illustrated, main support structure 26 is provided with a substantially circular cross-sectional area, however, other geometrical shapes providing adequate structural stability may be used. Primary track section 14 also includes a plurality of laterally extending track support members 28 spaced longitudinally along main support structure 26. The track support members 28 includes two upwardly facing and substantially flat support surfaces 30 that support an associated main track member 32 thereon. The geometrical cross-section of each main track member 32 is similar to that of railway rails. Specifically, as illustrated, each main track member 32 is similar to rails described as ASCE (American Society of Civil Engineers) No. 25 rails. However, other rails capable of supporting the carriage 20 and passenger vehicle 22 combination and allow for mobility of such combination therealong may be utilized. The main track members 32 extend in an end-to-end fashion and may be welded or spliced together, or connected by some other appropriate means.

Figure 4A:
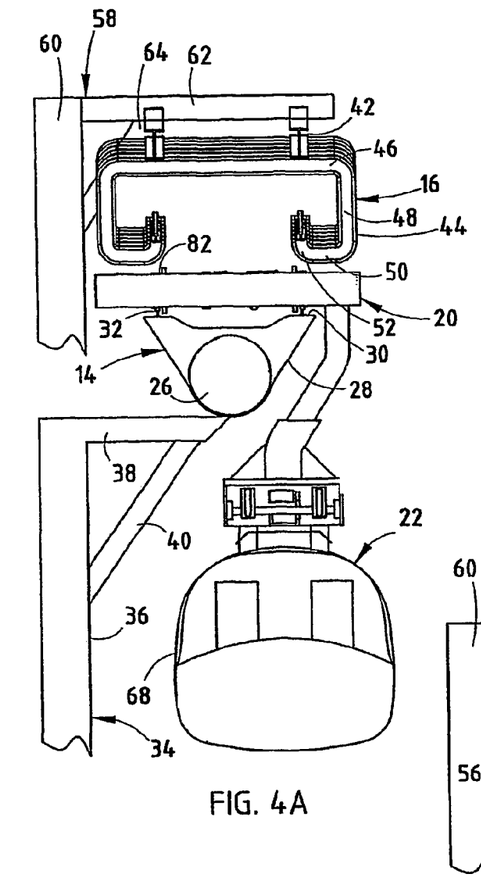
FIG. 4A is a rear elevational view of the main track section, the switch track section, the carriage and vehicle supported by the main track section.

Main support structure 26 of primary track section 14 is supported above a surface such as the ground via a plurality of primary track supporting poles or structures 34. Each primary track supporting pole 34 includes a vertically extending pole 36 which is anchored into the ground, a supporting arm 38 extending laterally outward from each pole 36, and a support brace 40 angularly extending between each pole 36 and the assembled supporting arm 38, thereby structurally supporting support arm 38. Each support arm 38 is fixedly attached to main support structure 26, thereby supporting main support structure 26 above ground level.

The switching track section 16 includes a pair of longitudinally extending switching track support structures 42 to which a plurality of laterally extending switch track support members 44 are fixedly attached and spaced longitudinally there along. Switch track support structures 42 are provided with an I-beam type shape, however, other geometrical shapes may be utilized. Each switch track support member 44 is provided with a downwardly opening substantially C-shaped geometrical shape that includes a top section 46 that is fixedly attached to the pair of switch track support structures 42, side sections 48 that extend downwardly from top section 46, inwardly extending bottom sections 50 that extend inwardly from side sections 48, and upwardly extending rail support sections 52 that extend upwardly from bottom sections 50. Each rail support section 52 includes an upwardly facing rail mounting surface 54 upon which a switching track member 56 is fixedly attached. Each switching track member 56 is provided with a geometrical cross-sectional shape similar to that of main track members 32 as described above.

The switching track section 16 is supported above ground level by a plurality of switching track supporting poles or structures 58. Each supporting pole 58 includes a vertically extending pole 60 having one end anchored into the ground, a supporting arm 62 extending laterally outward from pole 60, and a support brace 64 extending between each pole 60 and support arm 62, thereby providing structural support to support arm 62.

Figure 3A:
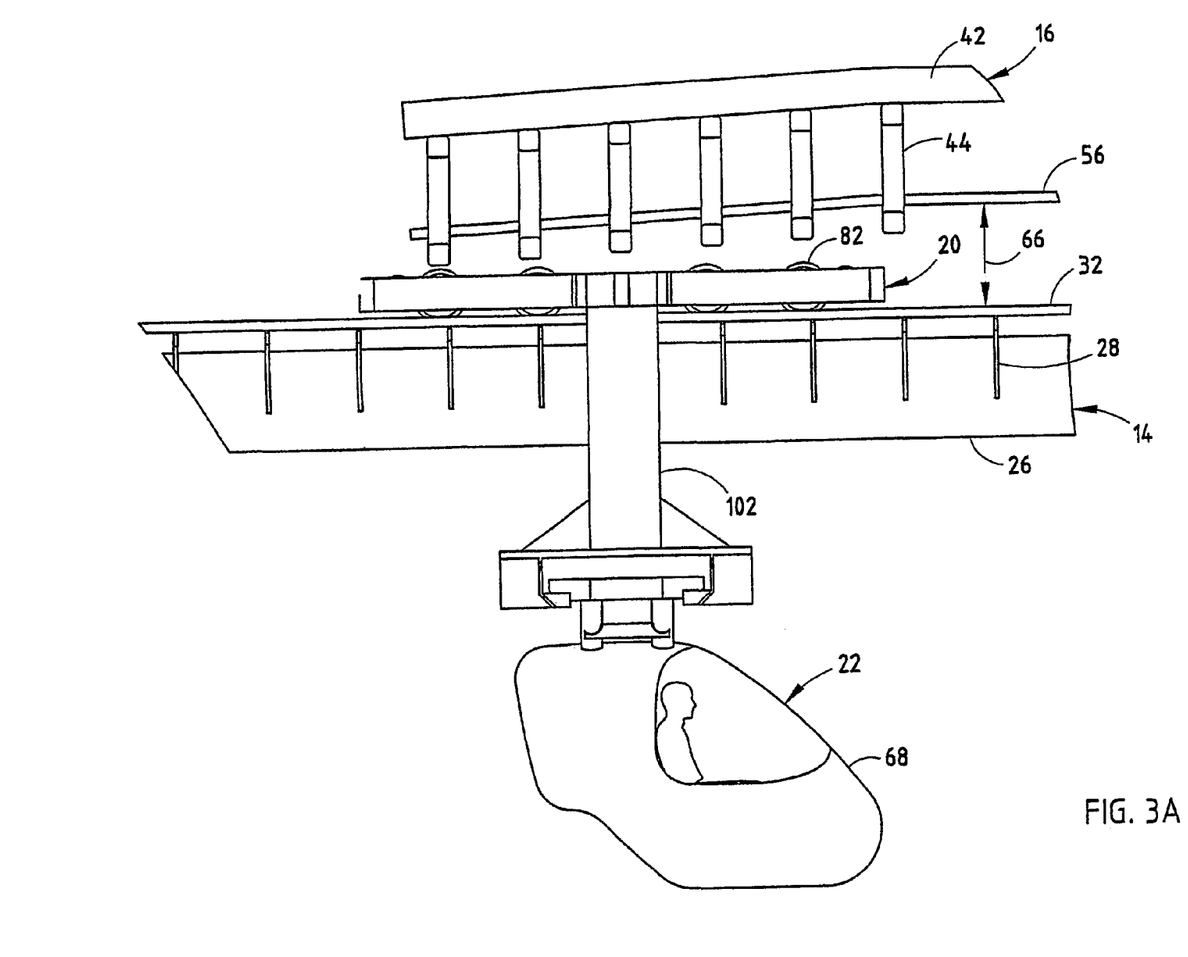
FIG. 3A is a side elevational view of a main track section, a switch track section, and a carriage and a vehicle supported by the main track section.
Figure 3B:
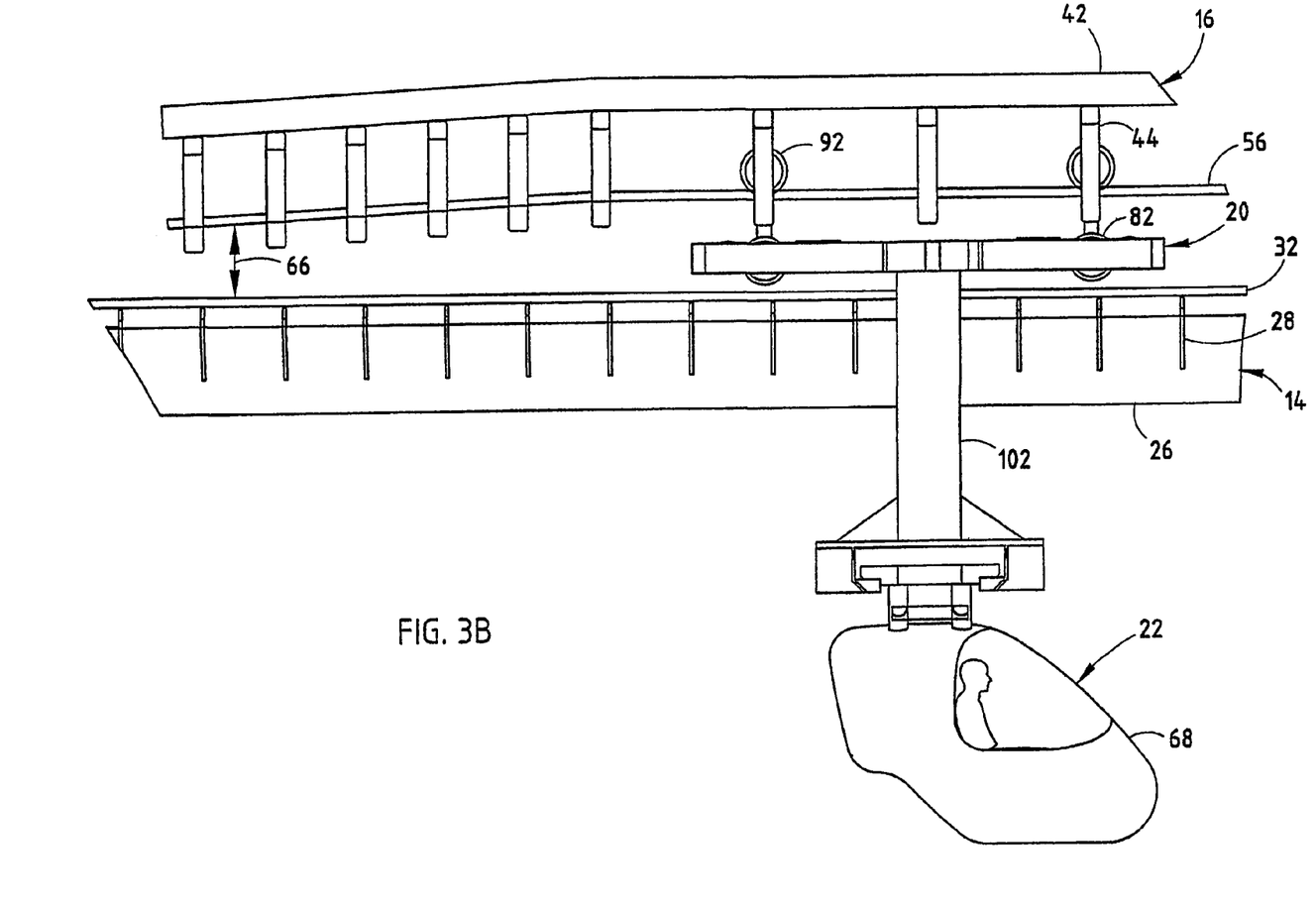
FIG. 3B is a side elevational view of the main track section, the switch track section, the carriage and vehicle supported by the switch track section.

The track system 12 is constructed such that at least a portion of switching track members 56 are vertically aligned with main track members 32. This alignment allows for ease in switching the carriage 20 and passenger vehicle 22 combination from being supported by primary track section 14 and switching track section 16, as described below. In addition, as best illustrated in FIG. 3, the switching track section 16 is oriented with respect to the primary track section 14, such that the vertical distance between main track member 32 and a corresponding switching track member 56, as indicated by arrow 66, changes along the longitudinal length of track system 12. The change in distance of the vertical distance 66 is utilized when switching the carriage 20 and passenger vehicle 22 combination from being supported on primary track section 14 to being supported on switching track section 16, and vice versa, is described below.

Vehicle 22 includes an aerodynamically shaped outer shell or body 68 which is constructed of a high strength plastic. It should be noted that while outer shell 68 is preferably constructed of a lightweight, high strength plastic, other suitable materials may be utilized. In the examples illustrated in FIGS. 3 and 4, passenger vehicle 22 is underslung beneath the track system 12.

Figure 5:
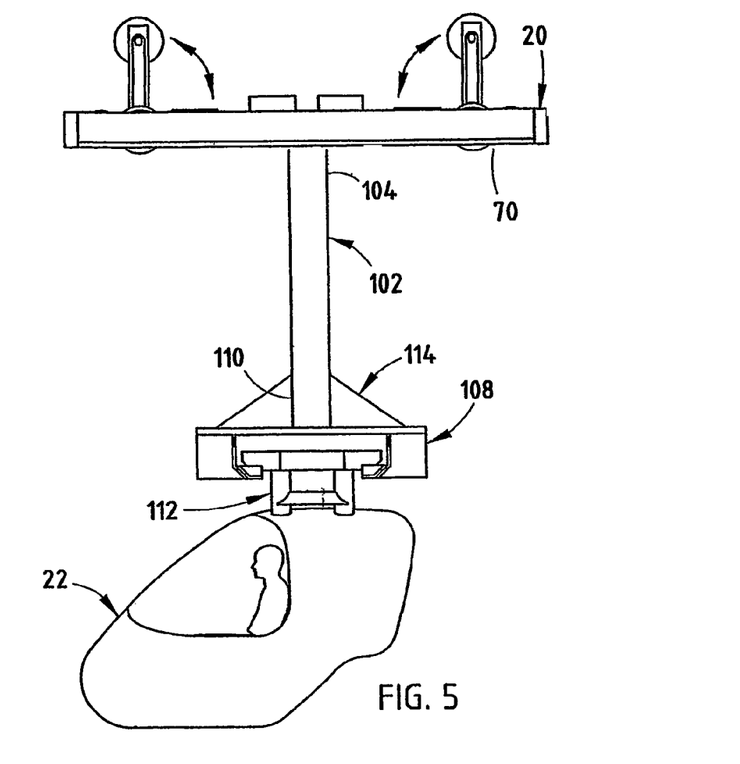
FIG. 5 is a side elevational view of the carriage and vehicle.
Figure 6:
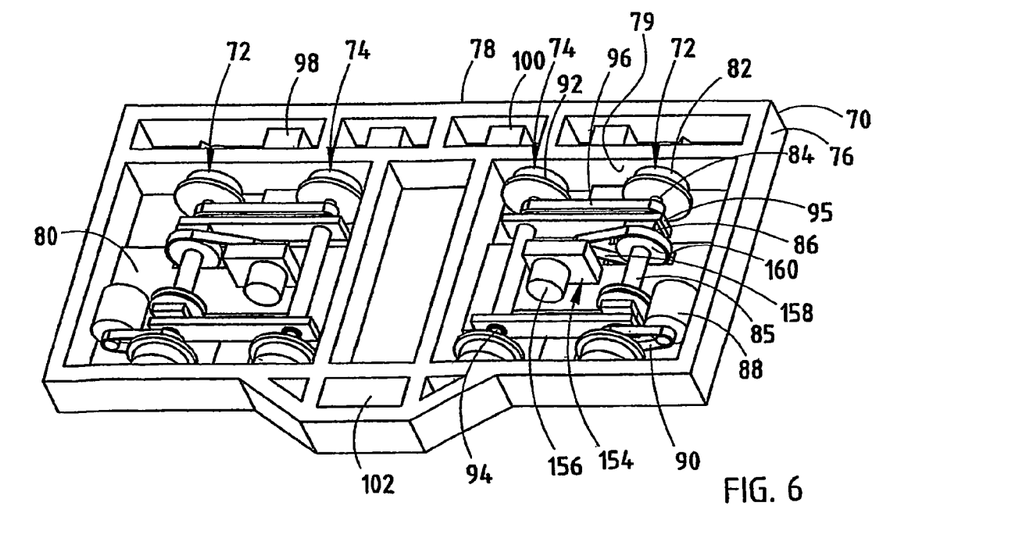
FIG. 6 is a perspective view of a housing and drive units of the carriage.

Carriage system 20 (FIG. 5) detachably supports an associated passenger vehicle 22 therebelow. Carriage system 20 includes a housing 70 (FIG. 6) assembly that houses a primary drive system 72 and a secondary drive system 74. Housing 70 includes end wall 76, side walls 78, a bottom wall 80 and longitudinally extending inner walls 79. Primary drive system 72 is adapted to propel the carriage system 20 and passenger vehicle 22 combination along main track members 32 of primary track section 14, while secondary drive system 74 is adapted to drive the carriage system 20 and passenger vehicle 22 combination along switching track members 56 of switching track section 16.

The primary drive system 72 includes two pairs of primary drive wheels 82 located at opposite ends of housing 70 and adapted to ride along main track members 32 of primary track section 14, as shown in FIGS. 3A and 4A. Each wheel 82 is preferably constructed of steel, a hard polyurethane material, or a combination of both, although other suitable materials may be used. Wheels 82 are connected in pairs via laterally extending axles 84 which are rotatably supported in housing 70 by a pair of bearings located within interior walls 79. A pair of drive motors 88 are also located within housing 70 and provide the power required to motivate the carriage 20 and vehicle 22 combination along track system 12. Each drive motor 88 is mechanically coupled with an associated axle 84 via drive belts 90. Although drive belts 90 are illustrated, other methods of mechanically coupling each drive motor 88 with their associated axle 84 may be utilized.

The secondary drive system 74 includes two pairs of wheels 92 placed at opposite ends of housing 70 and which are adapted to propel the carriage system 20 and passenger vehicle 22 combination along switching track members 56 of switching track section 16. Each wheel 92 is preferably constructed of steel, a soft polyurethane, or a combination of both, although other suitable materials may be used. Each pair of wheels 92 are connected via a laterally extending axle 94 that is supported within housing 70 via a pair of switching arms 95 that are attached to tubes 85 that surround each of axles 84. Each tube 85 is fixedly attached to switching arms 95 and rotatably attached to bearing plates 86. Each axle 94 is mechanically linked with an associated axle 84 via an auxiliary drive belt 96, although other types of mechanical linkage may be utilized.

As illustrated, drive motor 88 is an electric motor receiving power from a plurality of batteries 98 contained within housing 70, or alternatively, a bank of capacitors 100 also located within housing 70. Alternatively, drive motor 88 can include some form of a hybrid engine, a gas-powered engine, or any other power unit capable of generating mechanical power adequate to propel the carriage system 20 and passenger vehicle 22 combination along track system 12. Further, drive motor 88 can include a wheel-motor (i.e. a brushless motor contained inside an associated wheel), which may be incorporated into any of wheels 82 and 92 as necessary.

Figure 4B:
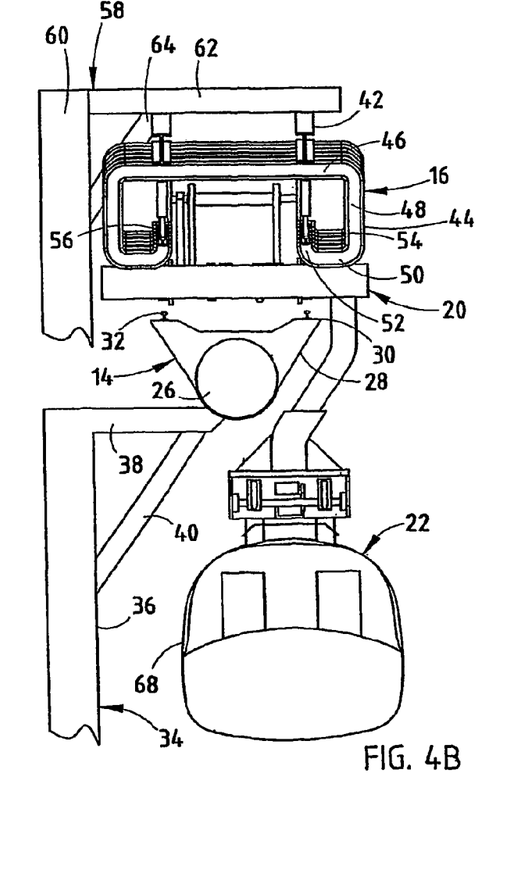
FIG. 4B is a rear elevational view of the main track section, the switch track section, and the carriage and vehicle supported by the switch track section.

In operation, a pair of switching actuators 154 are used to switch the carriage 20 and passenger vehicle 22 combination between primary track section 14 and switching track section 16. Each switch actuator 154 includes an electric motor 156 that is mechanically linked to an associated tube 85 via an actuator belt 158 and gear 160. Motor 156 of switch actuator 154 is used to rotate tubes 85 and switching arms 95, thereby causing secondary drive systems 74, and more specifically, wheels 92, to rotate between a storage position wherein wheels 92 are held in close proximity to housing 70, as illustrated in FIGS. 3A and 4A, and an in-use or switching position, wherein the wheels 92 rotate outwardly away from housing 70, as shown in FIGS. 3B and 4B. The carriage 20 and passenger vehicle 22 combination is propelled along main track members 32 of primary track section 14 as wheels 82 of primary drive system 72 contact and rotate along main track members 32. As the carriage 20 and passenger vehicle 22 combination approaches a switching track section 16, switch actuators 154 are activated, thereby moving wheels 92 from the storage position into the switching or in use position. As best illustrated in FIG. 3B, wheels 92 contact and begin to drive along switching track members 56 of switching track section 16. As the carriage 20 and passenger vehicle 22 combination travels along primary track section 14, the distance 66 between switching track members 56 and main track members 32 increases until wheels 82 of primary drive system 72 are no longer in contact with main track members 32 of primary track section 14. At this point, the carriage 20 and passenger vehicle 22 combination is wholly supported by switching track section 16. The carriage 20 and passenger vehicle 22 combination can then be redirected via switching track section 16 to align with another primary track section 14 to disengage the carriage 20 and passenger vehicle 22 combination from switching track section 16 and onto another primary track section 14 or loading/unloading track section 18, the reverse operation of that described above is performed.

The carriage system 20 also includes a vehicle supporting arm 102 that is fixedly attached at a proximal end 104 to housing 70 of carriage 20. Vehicle support arm 102 supports a coupling system 108 from a distal end 110 thereof. Coupling system 108 allows coupling and decoupling of passenger vehicle 22 from carriage system 20.

Coupling system 108 includes a first portion 112 connected with passenger vehicle 22 and a second portion 114 connected with carriage system 20. Coupling system 108 allows vehicle 22 to be coupled with and decoupled from carriage 20 by moving first portion 112 of coupling system 108 laterally with respect to second portion 114 of coupling system 108 and the normal longitudinal direction of travel of vehicle 22 along track system 12.

Figure 7:
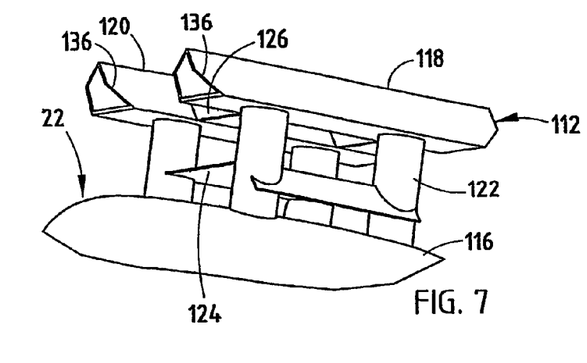
FIG. 7 is a perspective view of a first portion of a coupling system.

First portion 112 (FIG. 7) of coupling system 108 is attached to a top portion 116 of vehicle 22 and includes an outwardly extending cantilevered first arm 118 and an outwardly extending cantilevered second arm 120. Each cantilevered arm 118 and 120 is affixed to top portion 116 of vehicle 22 by a pair of upwardly extending supports 122. A structural support web 124 extends between and connects each of supports 122, thereby providing structural stability to supports 122, as well as providing protection to top portion 116 of vehicle 22. In addition, structural reinforcements 126 extend between arms 118 and 120. Second portion 114 (FIG. 8) of coupling system 108 includes a housing 128 that includes a top section 130 and side sections 132 that extend downwardly from top section 130. A suspension lip 134 extends between each pair of side sections 132.

In operation, each vehicle 22 can be coupled and uncoupled from an associated carriage system 20 by coupling and decoupling first portion 112 from second portion 114 of coupling system 108. Specifically, cantilevered first and second arms 118 and 120 of first portion 112 can be laterally maneuvered within the C-shaped second portion 114 of coupling system 108 until first arm 118 and second arm 120 are located within second portion 114 of coupling system 108. First arm 118 and second arm 120 of first portion 112 are then lowered until first arm 118 and second arm 120 of first portion 112 contact suspension lip 134 of second portion 114, thereby suspending first portion 112 and vehicle 22 from second portion 114 and carriage system 20. As illustrated, the ends 136 of first arm 118 and second arm 120 are provided with an angled or beveled surface. Suspension lip 134 of second portion 114 may also be provided at an angle which substantially matches the angles of ends 136 of first and second arm 118 and 120, thereby providing additional stability between first portion 112 and second portion 114 of coupling system 108. It should be noted that, as illustrated, each side section 132 includes an inwardly extending wall 137 that cooperates with suspension lip 134 to form recesses 138 within which end 136 of first and second arms 118 and 120 are seated when first portion 112 is coupled with second portion 114 of coupling system 108. This is an advantage in that it provides additional stability to vehicle 22 and eliminates the possibility of uncoupling vehicle 22 from carriage 20.

Figures 8, 9A, 9B:
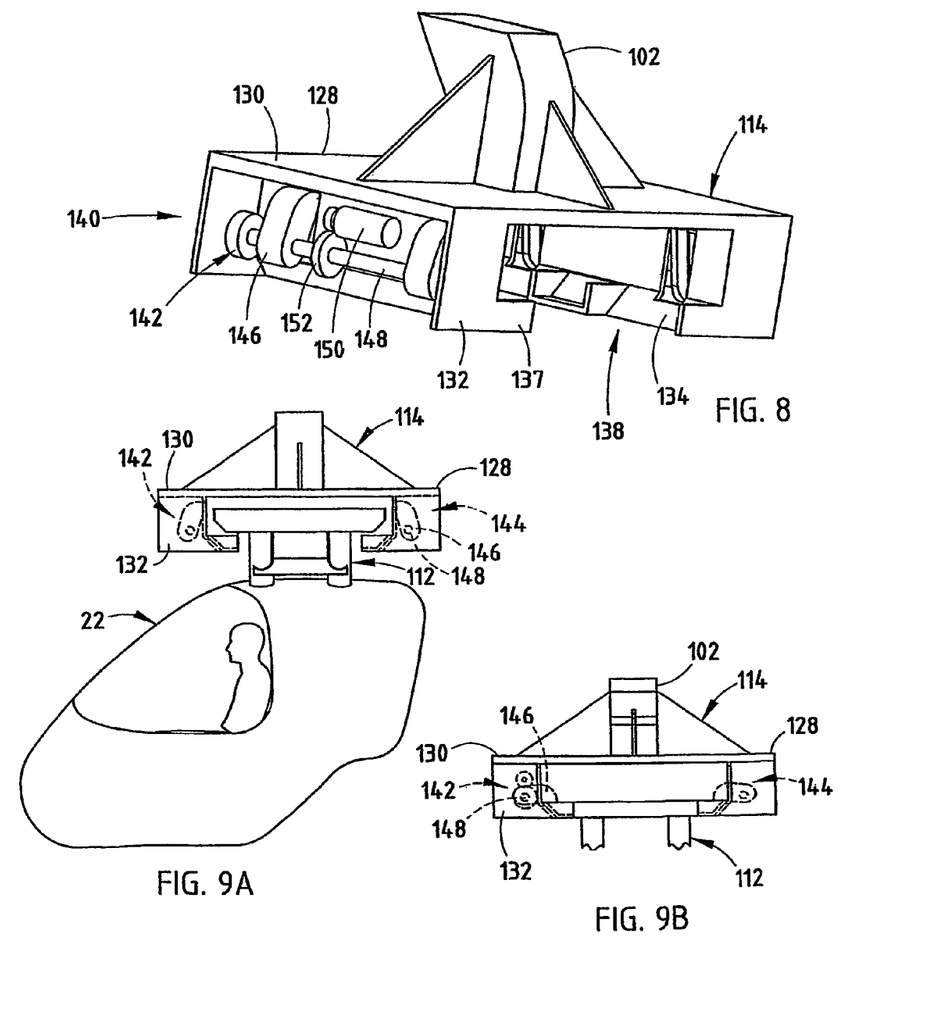
FIG. 8 is a perspective view of a second portion of a coupling system.
FIG. 9A is a side view of a locking system in an unlocked position.
FIG. 9B is a side view of a locking system in a locked position.

Coupling system 108 further includes a locking system 140, to inhibit the removal or decoupling of first portion 112 from second portion 114 of coupling system 108. Specifically, locking system 140 is located within second portion 114 of coupling system 108 and includes a first locking mechanism 142 (FIGS. 8, 9A and 9B) and a second locking mechanism 144. The first locking mechanism 142 and second locking mechanism 144 are substantially similar, therefore a description of first locking mechanism 142 only is contained herein and should be considered descriptive of both first and second locking mechanisms 142 and 144. First locking mechanism 142 includes a pair of locking cams 146 that rotate between an unlocked position, as shown in FIG. 9A, wherein vehicle 22 may be uncoupled from carriage 20, and a locked position, as shown in FIG. 9B, wherein locking cams 146 contact first and second arms 118 and 120, thereby inhibiting removal of ends 136 of first and second arms 118 and 120 from within recesses 138 of second portion 114. Locking cams 146 are each affixed to a shaft 148 that is rotatably fixed to side sections 132 of housing 128. An electric motor 150 is located within housing 128 and is mechanically linked to shaft 148 via a gear 152. Although a particular locking system and mechanisms are disclosed herein, other mechanisms capable of inhibiting separation or the coupling of the first portion 112 from second portion 114 of, coupling system 108 may be utilized.

The storage facility 24 (FIG. 2) is used to store passenger vehicle 22 when not in use. Several storage facilities 24 can be used within transit system 10 and may be placed at logical locations such as near large urban areas, business districts, housing communities, gathering areas such as sports arenas and shopping malls, or other points of interest such as amusement parks, etc. Each storage facility 24 includes a plurality of storage racks 162 and is connected to primary track section 14 via an associated loading/unloading track section 18. Vehicles are transferred from storage racks 162 to the loading/unloading track section 18 via an automated vehicle delivery system 164.

Figure 10:
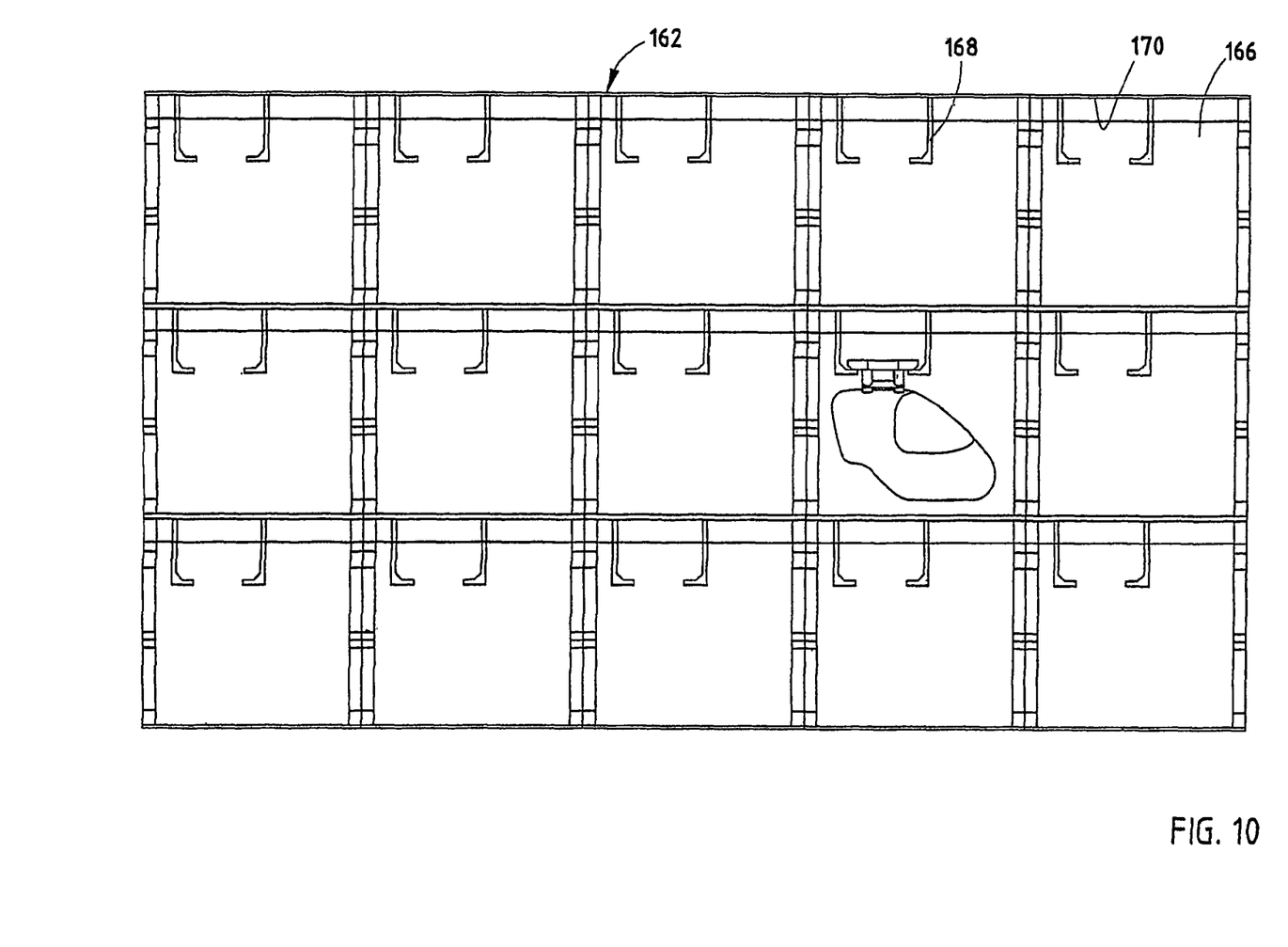
FIG. 10 is a side elevational view of the vehicle storage facility.

Each storage rack 162 (FIG. 10) includes a plurality of horizontally and vertically aligned cubicles 166 within which vehicles 22 are stored when not in use. Each cubicle includes a pair of hangers 168 that extend downwardly from an upper surface 170 of each cubicle 166 and which are used to support a vehicle 22 within cubicle 166. The horizontal and vertical arrangement of cubicles 166 provide a compact storage area within which vehicles 22 may be stored when not in used, thereby reducing the overall space required for "parking" as compared with parking facilities for conventional automobiles.

Vehicles 22 traveling along primary track section 14 are diverted to a loading/unloading track section 18 in a similar manner to that of switching between different primary track sections 14 via switch track section 16. After switch from primary track section 14 to loading/unloading track section 18, vehicles 22 are diverted to a loading/unloading area 172, where a plurality of vehicles 22 may be simultaneously loaded onto and unloaded from loading/unloading track section 18. As illustrated in FIG. 2, multiple loading/unloading track sections 18 and 18A may be provided in conjunction with a particular storage facility 24. It should be noted that while FIG. 2 illustrates an automated storage and retrieval system 173 that a manual type retrieval system may also be utilized as discussed below.

Automated vehicle delivery system 164 includes a plurality of feeder lines 174 that are located within loading/unloading area 172. Each feeder line 174 includes a plurality of segmented conveyors 175, and a first lifting device 176, such as a fork lift type device, that lifts the vehicle 22 and couples/uncouples vehicle 22 from carriage system 20. Conveyors 175 operate autonomously of one another and are capable of operating in both a forward direction and rearward direction, thereby delivering vehicle 22 to or away from first lifting device 176. The individual nature of conveyors 175 allow vehicles 22 to be independently indexed therealong. Each first lifting device 176 also includes at least one lifting arm 180 that extend outwardly from body 178, and that are adapted to engage first portion 112 of coupling system 108. A first supply line 182 includes a conveyor 183 that travels longitudinally along a pair of tracks 184. Conveyor 183 is adapted to receive vehicle 22 from feeder lines 174. A second supply line 188 includes a plurality of segmented conveyors 189 that operate autonomously from one another and are capable of operating in both a forward direction and a rearward direction, thereby delivering vehicle 22 to or away from first supply line 182. A third supply line 192 includes a track 194 traveling laterally to segmented conveyors 189 and adjacent to cubicles 166, and a second lifting device 196 that travels along track 194.

In operation, the carriage 20 and passenger vehicle combination 22 travels along primary track section 14 in a direction indicated by arrow 199 until it reaches a final destination. The carriage 20 and passenger vehicle 22 combination is then switched, as described above, from primary track section 14 to loading/unloading track section 18 and travels along loading/unloading track section 18 in a direction indicated by arrow 198 until the carriage 20 and passenger vehicle combination 22 reach loading/unloading area 172 of storage facility 24. The carriage 20 and passenger vehicle 22 combination are aligned with one of the feeder lines 174. Locking system 140 is then unlocked, as described above, so that first portion 112 of coupling system 108 may be uncoupled from second portion 114 of coupling system 108, and vehicle 22 may be uncoupled from carriage 20. Vehicle 22 is then uncoupled from carriage 20 and placed within storage facility 24. It should be noted that after vehicle 22 is uncoupled from carriage 20, carriage 20 may either be coupled with a new vehicle 22 or may continue along track system 12 to a location where it is more urgently needed.

Vehicle 22 is then uncoupled from carriage 20 and placed within storage facility 24 by engaging lifting arm 180 of lifting device 176 within first portion 112 of coupling system 108. Vehicle 22 is then lifted from engagement with carriage 20 and moved in a lateral direction with respect to the longitudinal normal direction of travel of vehicle 22 along loading/unloading track section 18, until vehicle 22 is uncoupled from carriage 20. Vehicle 22 is then placed upon conveyors 175 and moved therealong until vehicle 22 is brought into close relation with conveyor 183. Vehicle 22 is then transferred to conveyor 183 and then moved along track 184 until conveyor 183 is longitudinally aligned with segmented conveyors 189 of second supply line 188. Vehicle 22 is then transferred along conveyors 189 of second supply line 188 until vehicle 22 is brought into alignment with a line of cubicles 166, such as shown by position 190. The segmented conveyors 189 that is aligned with cubicles 166 is then moved laterally with respect to second supply line 188 until vehicle 22 is located within position 190. Vehicle 22 is then transferred to second lifting device 196 by maneuvering second lifting device 196 until the associated lifting arm 197 engages first portion 112 of coupling system 108. Vehicle 22 is then moved along track 194 until vehicle 22 is horizontally aligned with the appropriate cubicle 166. Vehicle 22 is then moved vertically with respect to track 194 until vehicle 22 is vertically aligned with hangers 168 of the appropriate cubicle 166. Alternatively, vehicle 22 may be simultaneously moved horizontally and vertically with respect to track 194 into alignment with hangers 168 of the appropriate cubicle 166. Arms 197 of second lifting device 196 are then telescoped outwardly until hangers 168 engage first portion 112 of coupling device 108, thereby placing vehicle 22 within cubicle 166 for storage. For retrieving vehicle 22 from storage within storage facility 24, the reverse process of that described above for storing vehicle 22 is conducted.

A second loading/unloading area 172A is provided for vehicles traveling on a primary track section 14A in direction indicated by arrow 200 that is opposite to direction 199. Second loading/unloading area 172A is constructed similarly to loading/unloading area 172, and is linked with storage facility 24 via second supply line 188 that travels above primary track sections 14 and 14A and loading/unloading track section 18 and 18A.

Figure 11:
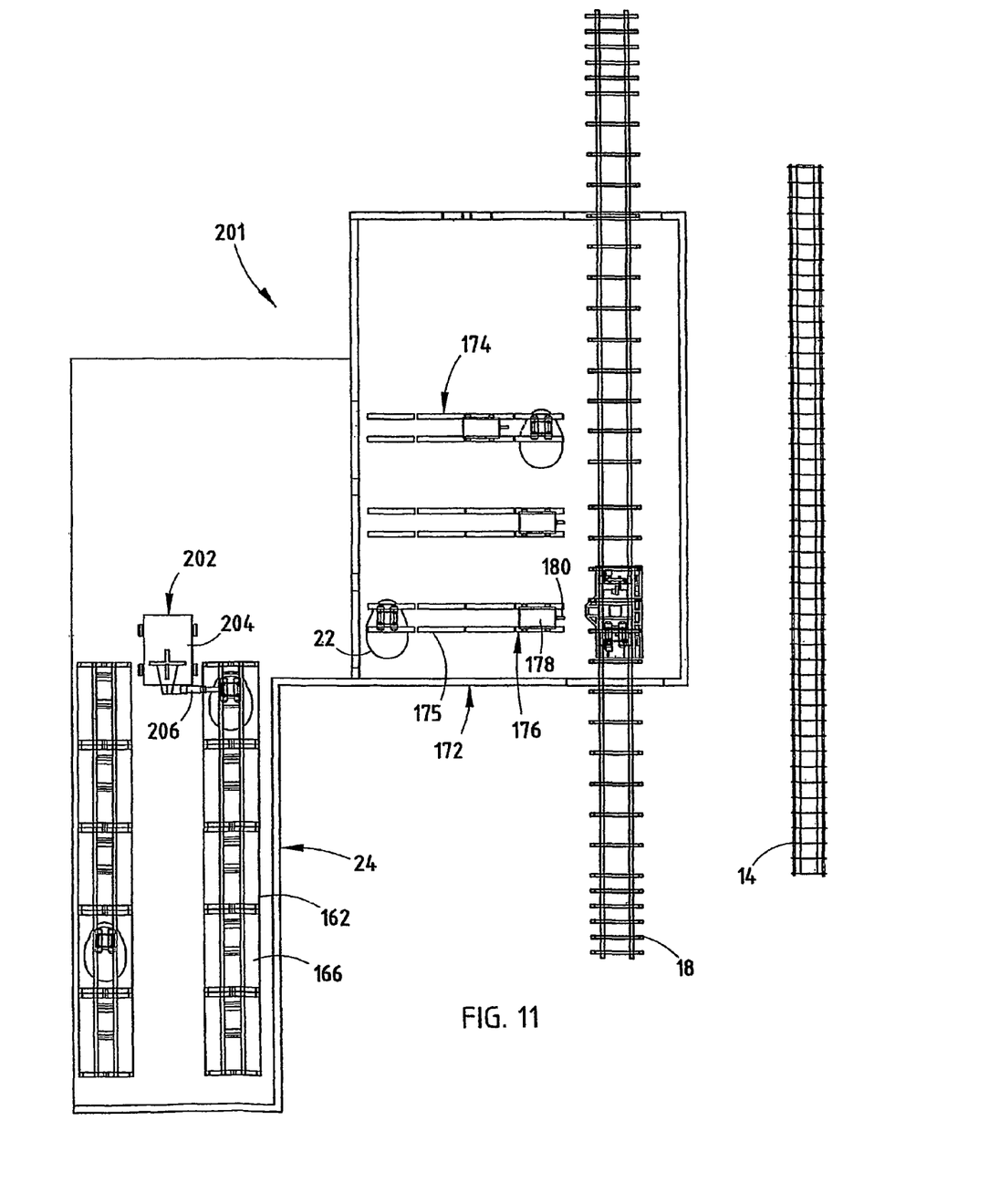
FIG. 11 is a top plan view of the loading/unloading track section and an alternative vehicle storage facility including a manual storage and retrieval system.

A manual-type vehicle storage and retrieval system 201 is shown in FIG. 11, wherein first supply line 182 (FIG. 2), second supply line 188 and third supply line 192, are replaced by a mobile lifting device 202 that is similar to a mobile fork lift. Lifting device 202 includes a main body 204 and a lifting arm 206. Lifting arm 206 is rotatable with respect to body 204, and it telescoping such that lifting arm 206 may be telescoped away from body 204. In operation, mobile lifting device replaces the operations of first, second and third supply lines 182, 188 and 192, by receiving vehicle 22 from conveyors 175 and placing vehicle 22 into the appropriate cubicle 166.

In an alternative embodiment, the carriage 20 and passenger vehicle 22 combination may be constructed such that vehicle 22 is supported above carriage 20 rather than being underslung therebelow.

In the foregoing description, it will be readily appreciated by those skilled in the art that modifications may be made to the invention without departing from the concepts disclosed therein. Such modifications are to be considered as included in the following claims, unless these claims by their language expressly state otherwise.

The invention claimed is:

1. A transportation system, comprising: a passive track system including at least one track member extending for a distance characteristic of a transportation system for conveying people and/or cargo from a first location to a second location; a vehicle defining a carrying space therein large enough to carry at least one person or a comparable amount of cargo; and a carriage system readily releasably coupled with and supporting the vehicle from the main track member, such that the vehicle is not directly supported by the track, the carriage having no carrying space large enough to carry a person or comparable amount of cargo, the carriage system including at least one self contained propulsion unit for generating the power to propel the carriage system and supported vehicle along the main track member, and a primary drive for transferring the power generated by the propulsion unit to the main track member and propelling the vehicle along the main track member; wherein the vehicle is readily releasably coupled to the carriage system via a coupling system; and wherein the vehicle includes a first portion of the coupling system, the carriage system includes a second portion of the coupling system, and wherein the coupling system is adapted to allow the vehicle to be coupled with the carriage system by moving the first portion of the coupling system in a lateral direction relative to the normal direction of travel of the vehicle along the main track member.

2. The transportation system of claim 1, wherein the second portion of the coupling system including a downwardly opening C-shaped support structure adapted to receive the first portion of the coupling system therein, thereby supporting the vehicle from the track system.

3. The transportation system of claim 2, wherein the first portion of the coupling system includes an outwardly extending cantilevered first arm and an outwardly extending cantilevered second arm, and wherein the second portion of the coupling system includes an inwardly extending first supporting arm and an inwardly extending second supporting arm, which are adapted to support the cantilevered first arm and the cantilevered second arm of the first portion of the coupling system, respectively.

4. The transportation system of claim 3, wherein the inwardly extending first supporting arm and second supporting arm each include a recessed portion therein adapted to receive the cantilevered first arm and second arm therein, respectively, such that the first portion of the coupling system is moved laterally with respect to the second portion of the coupling system and then lowered with respect to the second portion of the coupling system until the cantilevered first arm and the cantilevered second arm rest within the recessed portion of the first and second supporting arms, thereby inhibiting lateral movement of the vehicle relative to the carriage unit.

5. The transportation system of claim 4, wherein the second portion of the coupling system includes at least one locking member that engages the first portion of the coupling system, thereby limiting vertical movement of the first portion of the coupling system relative to the second portion of the coupling system and preventing accidental disengagement of the first portion of the coupling system from the second portion of the coupling system.

6. A transportation system, comprising:
a static overhead track system including at least one main track member extending for a distance characteristic of a transportation system for conveying people and/or cargo from a first location to a second location;
an underslung vehicle defining a carrying space therein; and
a carriage system readily detachably coupled with and supporting the underslung vehicle from the main track member, the carriage system having no carrying space large enough to carry a person or comparable volume of cargo, the carriage system including at least one self contained propulsion unit for generating the power to propel the carriage and supported vehicle along the main track member, and a primary drive for transferring the power generated by the propulsion unit to the main track member and propelling the vehicle along the main track member;
wherein the vehicle is readily releasably coupled to the carriage system via a coupling system, the vehicle includes a first portion of the coupling system, the carriage system includes a second portion of the coupling system, and wherein the coupling system is adapted to allow the vehicle to be coupled with the carriage system by moving the first portion of the coupling system in a lateral direction relative to the normal direction of travel of the vehicle along the main track member.

7. The transportation system of claim 6, wherein the second portion of the coupling system including a downwardly opening C-shaped support structure adapted to receive the first portion of the coupling system therein, thereby supporting the vehicle from the track system.

8. The transportation system of claim 7, wherein the first portion of the coupling system includes an outwardly extending cantilevered first arm and an outwardly extending cantilevered second arm, and wherein the second portion of the coupling system includes an inwardly extending first supporting arm and an inwardly extending second supporting arm, which are adapted to support the cantilevered first arm and the cantilevered second arm of the first portion of the coupling system, respectively.

9. The transportation system of claim 8, wherein the inwardly extending first supporting arm and second supporting arm each include a recessed portion therein adapted to receive the cantilevered first arm and second arm therein, respectively, such that the first portion of the coupling system is moved laterally with respect to the second portion of the coupling system and then lowered with respect to the second portion of the coupling system until the cantilevered first arm and the cantilevered second arm rest within the recessed portion of the first and second supporting arms, thereby inhibiting lateral movement of the vehicle relative to the carriage unit.

10. The transportation system of claim 9, wherein the second portion of the coupling system includes at least one locking member that engages the first portion of the coupling system, thereby limiting vertical movement of the first portion of the coupling system relative to the second portion of the coupling system and preventing accidental disengagement of the first portion of the coupling system from the second portion of the coupling system.

11. A transportation vehicle system, comprising:
a vehicle adapted to define a carrying space therein and adapted to travel in a longitudinal direction along a track, the vehicle including a first portion of a coupling system;
a carriage system for readily releasably coupling and supporting the vehicle, the carriage system including a second portion of the coupling system mateable with the first portion of the coupling system; and
wherein the vehicle is coupled and uncoupled with the carriage system by moving the first portion of the coupling system in a substantially lateral direction relative to the longitudinal direction of travel of the vehicle.

12. The transportation system of claim 11, wherein the carriage system supports the vehicle below the carriage system such that the vehicle is underslung below the carriage system.

13. The transportation system of claim 12, wherein the first portion of the coupling system is fixedly attached to an upper surface of the vehicle, and wherein the carriage system includes the second portion of the coupling system, the second portion of the coupling system including a downwardly opening C-shaped support structure adapted to receive the first portion of the coupling system therein, thereby supporting the vehicle from the carriage system.

14. The transportation system of claim 13, wherein the first portion of the coupling system includes an outwardly extending cantilevered first arm and an outwardly extending cantilevered second arm, and wherein the second portion of the coupling system includes an inwardly extending first supporting arm and an inwardly extending second supporting arm, which are adapted to support the cantilevered first arm and the cantilevered second arm of the first portion of the coupling system, respectively.

15. The transportation system of claim 14, wherein the inwardly extending first supporting arm and second supporting arm each including a recessed portion therein adapted to receive the cantilevered first arm and second arm therein, respectively, such that the first portion of the coupling system is moved laterally with respect to the second portion of the coupling system and then lowered with respect to the second portion of the coupling system until the cantilevered first arm and the cantilevered second arm rest within the recessed portion of the first and second supporting arms, thereby inhibiting lateral movement of the vehicle relative to the carriage unit.

16. The transportation system of claim 15, wherein the second portion of the coupling system includes at least one locking member that engages the first portion of the coupling system, thereby limiting vertical movement of the first portion of the coupling system relative to the second portion of the coupling system and preventing accidental disengagement of the first portion of the coupling system from the second portion of the coupling system.

17. A transportation system, comprising:
an overhead track system, including a main track member and switching track member, at least a portion of the main track member and the switching track member being vertically aligned;
an underslung vehicle defining a carrying space therein; and
a carriage system supporting the vehicle beneath the overhead track system, the carriage system including a primary drive for propelling a vehicle along the main track member, and a switching system adapted to switch the carriage system from being supported by the main track member to being supported by the switching track member, the switching system including a secondary drive for propelling a vehicle along the switching track member; and
wherein the secondary drive swings inline with the main track member, thereby ensuring that the secondary drive is aligned with the main track member at all times.

18. The transportation system of claim 17, wherein at least a portion of the main track member and the switching track member converge and diverge in a vertical direction.

19. The transportation system of claim 18, wherein the primary drive includes at least one first engagement member that contacts the main track member and propels the carriage vehicle along the main track member.

20. The transportation system of claim 19, wherein the at least one first engagement member includes a wheel.

21. The transportation system of claim 20, wherein at least a portion of the wheel of the first engagement member is constructed of a hard polyurethane material.

22. The transportation system of claim 21, wherein the secondary drive includes at least one second engagement member adapted to contact the switching track member and propel the carriage system and the vehicle along the switching track member.

23. The transportation system of claim 22, wherein the engagement member of the secondary drive includes a wheel.

24. The transportation system of claim 23, wherein at least a portion of the wheel of the secondary drive is constructed of a soft polyurethane material.

25. The transportation system of claim 17, wherein the primary drive includes at least one first engagement member that contacts the main track member and propels the carriage vehicle along the main track member.

26. The transportation system of claim 25, wherein the at least one first engagement member includes a wheel.

27. The transportation system of claim 26, wherein at least a portion of the wheel of the first engagement member is constructed of a hard polyurethane material.

28. The transportation system of claim 17, wherein the secondary drive includes at least one second engagement member adapted to contact the switching track member and propel the carriage system and the vehicle along the switching track member.

29. The transportation system of claim 28, wherein the engagement member of the secondary drive includes a wheel.

30. The transportation system of claim 29, wherein at least a portion of the wheel of the secondary drive is constructed of a soft polyurethane material.

* * * * *

UNITED STATES PATENT AND TRADEMARK OFFICE
CERTIFICATE OF CORRECTION

PATENT NO. : 7,921,782 B2
APPLICATION NO. : 10/469711
DATED : April 12, 2011
INVENTOR(S) : Keller et al.

It is certified that error appears in the above-identified patent and that said Letters Patent is hereby corrected as shown below:

In the Specifications

Column 1
*Lines 27-28, "In addition of the" should be -- In addition to the --
*Line 33, "are" should be -- is --
*Line 39, "inconveniences" should be -- inconvenience --
*Line 46, "principal of first-come-first-serve" should be -- principle of first come, first served --
*Line 51, "A individual" should be -- An individual --
*Line 52, "congestions" should be -- congestion --

Column 2
*Line 66, "systems" should be -- system --

Column 5
*Line 5, "there along" should be -- therealong --
*Line 30, "are" should be -- is --

Column 6
*Line 6, "are" should be -- is --
*Line 7, "provide" should be -- provides --
*Line 12, "their" should be -- its --
*Line 20, "are" should be -- is --
*Line 39, "are" should be -- is --

Column 7
*Lines 6-7, "18, the" should be -- 18, and the --
*Line 54, "second arm 118" should be -- second arms 118--
*Line 60, "are" should be -- is --

Signed and Sealed this
Second Day of July, 2013

Teresa Stanek Rea
*Acting Director of the United States Patent and Trademark Office*

Column 8
*Line 22, "of, coupling" should be -- of coupling --
*Lines 42 and 43, "provide . . . used" should be -- provides . . . use --

Column 9
*Line 6, "extend . . . are" should be -- extends . . . is --
*Line 29, "are" should be -- is --
*Lines 54 and 55, "that is aligned . . . 166 is then" should be -- that are aligned . . . 166 are then --

Column 10
*Line 21, "telescoping" should be -- telescopes --
*Lines 22-23, "device replaces" should be -- device 202 replaces --